US010666748B2

(12) United States Patent
Mathis et al.

(10) Patent No.: US 10,666,748 B2
(45) Date of Patent: May 26, 2020

(54) REAL-TIME CALCULATED AND PREDICTIVE EVENTS

(71) Applicant: ADOBE INC., San Jose, CA (US)

(72) Inventors: Craig Mathis, American Fork, UT (US); James Harold Brown, Orem, UT (US); Joshua Aaron Hansen, Provo, UT (US); Deepak Pai, Karnataka (IN)

(73) Assignee: ADOBE INC., San Jose, CA (US)

( * ) Notice: Subject to any disclaimer, the term of this patent is extended or adjusted under 35 U.S.C. 154(b) by 546 days.

(21) Appl. No.: 14/451,148

(22) Filed: Aug. 4, 2014

(65) Prior Publication Data
US 2016/0036931 A1 Feb. 4, 2016

(51) Int. Cl.
H04L 29/08 (2006.01)
G06F 3/0481 (2013.01)

(52) U.S. Cl.
CPC ............ H04L 67/22 (2013.01); G06F 3/0481 (2013.01)

(58) Field of Classification Search
CPC .... G06Q 10/10; G06Q 10/109; G06Q 10/107; H04L 12/1822; H04L 67/22
USPC ........................................................ 715/751
See application file for complete search history.

(56) References Cited

U.S. PATENT DOCUMENTS

| 7,974,849 | B1* | 7/2011 | Begole | G06Q 10/0631 705/1.1 |
| 8,787,556 | B1* | 7/2014 | Cantu, II | G06F 3/0484 379/265.09 |
| 2008/0133287 | A1* | 6/2008 | Slattery | G06F 11/3419 705/32 |
| 2009/0143141 | A1* | 6/2009 | Wells | G07F 17/32 463/37 |
| 2013/0174045 | A1* | 7/2013 | Sarukkai | H04N 21/23439 715/744 |
| 2013/0218670 | A1* | 8/2013 | Spears | G06Q 30/0252 705/14.47 |
| 2013/0326563 | A1* | 12/2013 | Mulcahy | G06F 3/041 725/61 |
| 2014/0193047 | A1* | 7/2014 | Grosz | G06F 3/1242 382/118 |
| 2014/0214615 | A1* | 7/2014 | Greystoke | G06Q 30/0619 705/26.44 |
| 2014/0222503 | A1* | 8/2014 | Vijayaraghavan | G06Q 30/0201 705/7.29 |
| 2014/0297362 | A1* | 10/2014 | Kumar | G06Q 30/0201 705/7.29 |
| 2015/0178749 | A1* | 6/2015 | Meng | G06Q 30/0255 705/7.31 |

(Continued)

Primary Examiner — Joy M Weber
(74) Attorney, Agent, or Firm — Shook, Hardy & Bacon, L.L.P.

(57) ABSTRACT

Embodiments of the present invention provide systems, methods, and computer storage media directed to an analytics tool for detecting real-time user or "visitor" events based on real-time data. More specifically, events are detected based on actions not taken by a user. In this regard, events can be defined and, thereafter, detected based on inactions of a user. In some cases, events are inferred or predicted based on a calculated likelihood of a user not performing an action. Upon determining an event based on an action not being performed by a user, an interested party may be notified thereof such that the interested party can influence, in real-time, visitor conversion.

15 Claims, 6 Drawing Sheets

(56) References Cited

U.S. PATENT DOCUMENTS

2015/0199084 A1* 7/2015 Velusamy ............ G06F 3/04842
 715/716
2015/0331583 A1* 11/2015 Zhang ................. G06F 3/04842
 715/825

* cited by examiner

REAL-TIME CALCULATED AND PREDICTIVE EVENTS

BACKGROUND

Website providers have a significant interest in gathering and utilizing information gleaned from web analytics, for instance, to improve conversion rates. By way of example, a website provider may wish to understand the intent of a current visitor such that the content provided to the visitor can be tailored to encourage or redirect that intent. To assist with providing personalized experiences, some tools, such as the ADOBE TARGET tool, have been developed that provide mechanisms to create personalized digital experiences. Traditional marketing analytics systems may provide website owners and/or other interested parties with web analytics data based on actions taken by a user in association with the website, such as selected links, webpage views, etc.

SUMMARY

Embodiments of the present invention relate to methods, systems, and computer readable media directed to an analytics tool for detecting real-time user or "visitor" events based on real-time data. More specifically, events are detected based on actions not taken by a user. In this regard, events can be defined and, thereafter, detected based on inactions of a user. In some cases, events are inferred or predicted based on a calculated likelihood of a user not performing an action. Upon determining an event based on an action not being performed by a user, an interested party may be notified thereof such that the interested party can influence, in real-time, visitor conversion.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
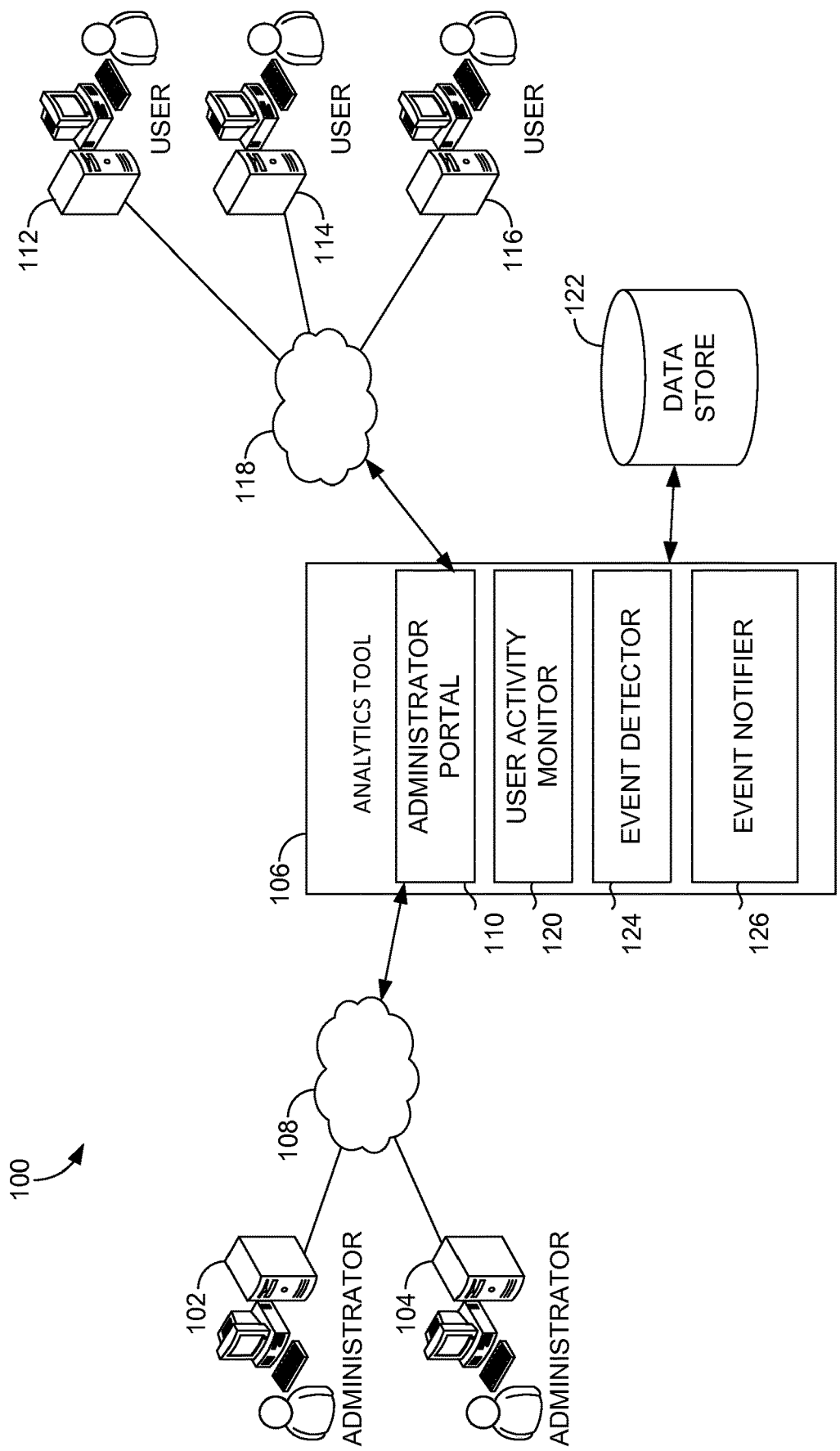
FIG. 1 is a schematic depiction of a system for detecting and predicting real-time events using live user interaction data.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Internet marketing strategies have made significant advancements in reaching out to and influencing web consumers as a result of studies of gathering live interactions between web consumers and websites with which they interact. For example, monitoring on-going actions such as "links clicked" and "items in shopping cart" are instrumental in deriving the perceived intent of the visiting web consumer. Traditional systems analyze on-going actions and attempt to correlate, based on historical use trends, whether the web consumer's on-going actions lead to a particular result, such as a conversion. Although analysis of performed user actions has been effective to target individuals, additional "unseen" information gathered about the web consumer's live inactions can also be analyzed for improved accuracy when deriving their future intent. As a result, more personalized or targeted experience can be provided to a web consumer when user inactions are analyzed.

Embodiments of the present invention are directed to detecting events occurring based on actions not taken by users. Generally, events to be detected based on a user inaction can be defined, for example, by way of an event rule designated by an administrator of an application. For instance, an event rule may specify an occurrence of an event when a first user interaction occurs followed by a lack of a second user interaction. In some cases, an event rule may be based on a likelihood that a user is not going to perform a particular action or set of actions.

Detecting events may be conducted while the user interactions with an application are being monitored. In this manner, analysis of user interactions can be conducted continuously, at specific time intervals, or triggered for calculation upon detection of specific user interaction. As such, conducting an analysis may take place during the active user's session, or in "real-time." For example, conducting an analysis of user interactions in intervals of less than five seconds may be sufficient to capture a "real-time" analysis of the user's interactions to detect events, though shorter intervals may be more effective.

Upon detecting an event associated with a user, an event notification can be generated and provided, for instance, to a computing device managing an application being monitored. In some cases, the user can then be provided with a targeted experience to influence the user. For example, the user may be provided with modified content, an advertisement, a notification, a request to initiate a chat session, or the like.

Various terms are used throughout this description. Although more details regarding various terms are provided throughout this description, general definitions of some terms are included below to provide a clearer understanding of the ideas disclosed herein:

As used herein, a user interaction refers to an interaction or action performed by a user in association with an application. A user interaction may include, for example, selection of a link, adding an item to a shopping cart, inputting payment information, purchasing an item, viewing a page, viewing an advertisement, etc.

An application refers to any application that can be interacted with by a user. In some cases, an application may be any web-based application including a web page, a website, any static or dynamic web content delivered in message form to a user (i.e. messages with URLs, read receipts, tracking information, etc.), or the like. In other cases, an application may be a standalone PC application, a mobile application, or even a backend application running on a remote system. In some cases, the application can be operated by a live or automated call center agent entering data into a system.

An event refers to a particular user interaction(s) or lack of user interaction(s) with an application. An event can be any occurrence or outcome that can be detected or inferred. As described herein, an event may be an action event or an inaction event. An action event refers to an event that is detected or inferred in association with an action(s) or activity(s) performed by a user. By way of example, an action event may include a selection of a link, a selection to purchase an item, navigation to a webpage, navigation to a particular webpage followed by selection of a link, etc. An inaction event refers to an event that is detected or inferred in association with an action(s) or activity(s) not performed by a user. In this regard, an inaction event can be inferred when a user has not performed a particular action or set of actions. By way of example, and without limitation, an inaction event may include a lapse of a predetermined time period without performing a particular activity (e.g., selection of a link, navigation to a webpage, etc.), not performing a particular activity after performing another particular activity, not completing a purchase of an item within a particular time following the item being added to a shopping cart, or the like.

Events can be defined via event rules. In this regard, an event is deemed to have occurred upon the determination that requirements of an event rule have been met. As used herein, the term "event rule" refers to defined requirements of monitored user interactions, or lack thereof, with an application for determining when the event is deemed to have occurred.

An event notification refers to any notification indicating a determination or inference of an event. Event notifications can be provided, for example, to a computing device managing an application.

Accordingly, in one aspect, an embodiment of the present invention is directed to one or more computer storage media storing computer-useable instructions that, when used by one or more computer devices, cause the one or more computing devices to perform operations. The operations include monitoring user interactions associated with an application, the user interactions being performed by a user. The operations also include determining an occurrence of an inaction event based on one or more user interactions not being performed by the user. The operations further include in accordance with the occurrence of the inaction event, automatically providing a notification of the occurrence of the inaction event.

In another embodiment of the present invention, an aspect is directed to a computer-implemented method. The method includes monitoring user interactions associated with an application, the user interactions being performed by a user. The method also includes determining, via a computing device, an intent score indicating an intent of the user to not perform an action in association with the application. The method further includes identifying that the intent score exceeds an intent threshold value. Based on the intent score exceeding the intent threshold value, an occurrence of an inaction event is inferred and a notification thereof is provided.

A further embodiment is directed to a computerized system. The system comprises one or more processors and one or more computer storage media storing computer-useable instructions that, when used by the one or more processors, cause the one or more processors to perform steps to define an event rule indicating an inaction for which to monitor in association with an application; receive a notification of the inaction associated with a user during the user's active application session based on an action not being performed by the user; and based on the notification of the inaction associated with the user, initiating a target experience for the user via the application.

Turning now to FIG. 1, a schematic depiction is provided illustrating an exemplary system 100 in which some embodiments of the present invention may be employed. Among other components not shown, the environment 100 may include administrator devices 102 and 104, an analytics tool 106, user devices 112, 114, and 116, and a data store 122. It should be understood that the system 100 shown in FIG. 1 is an example of one suitable computing system. Any of the components shown in FIG. 1 may be implemented via any type of computing device, such as computing device 600 described with reference to FIG. 6, for example. The components may communicate with each other via one or more networks 108 and 118, each of which may include, without limitation, one or more local area networks (LANs) and/or wide area networks (WANs). Such networking environments are commonplace in offices, enterprise-wide computer networks, intranets, and the Internet. Although illustrated as separate networks 108 and 118, any number of networks, including a single network, can be utilized to implement embodiments of the present invention.

It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In operation, the administrator devices 102 and 104 can access an analytics tool 106 over a network 108 (e.g., a LAN or the Internet). An administrator device, such as administrator device 102 and 104, can be any device that is used to manage an application for which data is analyzed. An application may be any web, mobile, application server, mail server, or PC application. In other cases, an application can be operated by a live or automated call center agent entering data into the system. In some cases, the administrator device accesses the analytics tool via a web browser, terminal, or standalone PC application operable on the administrator device. Administrator devices 102 and 104 may be operated by an administrator, which may be an individual(s) that manages an application. The administrator devices 102 and 104 may provide and/or receive data from the analytics tool 106. In some embodiments, the administrator devices 102 and 104 may provide one or more event rules to the analytics tool 106. Generally, an event rule can be a rule defined by an administrator that defines an event or triggers recognition thereof. Irrespective of whether administrator devices provide event rules to the analytics tool 106, the administrator devices 102 and 104 may be configured to receive analytics data. Such analytics data may include data that is based on inaction events, as described in more detail below.

The administrator devices 102 and 104 can be associated with the same or different applications. For example, the administrator devices 102 and 104 can both be used to manage a single application. In another example, the administrator device 102 can be used to manage a first application, and the administrator device 104 can be used to manage a second application. Although two administrator devices are illustrated in FIG. 1, any number of administrative devices can be used within the scope of embodiments contemplated.

The analytics tool 106 is generally configured to perform event detection and analysis. The analytics tool may include an administrator portal 110, a user activity monitor 120, an event detector 124, and an event notifier 126. Although illustrated as separate components of the analytics tool 106, any number of components can be used to perform the functionality described herein. Further, although illustrated as being a part of an analytics tool, the components can be distributed via any number of devices. For example, an administrator portal can be provided via one device while the user activity monitor can be provided via another device.

The administrator portal 110 is configured to enable administrators to manage a respective application. Accordingly, the administrator portal 110 can allow an administrator device, via the network 108, to access the analytics tool 106. In some cases, the administrator portal 110 can be used to permit an administrator to provide event rules to the analytics tool 106. For instance, the administrator portal 110 can provide a user interface that enables a user to provide one or more event rules and/or that provides data indicating event occurrences.

The user activity monitor 120 is configured to monitor user activity. User activity refers to any user interaction or actions with an application. User activities may include, by way of example only, advertisements viewed, URLs visited, links selected, adding items to a shopping cart, deleting items from a shopping cart, saving items, updating items, and other user input activities. User input activities may include, for instance, keyboard strokes, mouse movements and selections, voice detection, webcam interactions, etc. User activities may be stored, for example, in the data store 122. Capturing user activities can be used to detect events based on user action and/or inaction.

In some cases, the user activity monitor 120 may be configured to capture user activity in accordance with the specific user performing the activity. As such, a user may be assigned a unique identifier to uniquely identify each user and capture activities performed thereby. The unique identifier may be static for the user or may be dynamically assigned, for example, as a session identifier for each application visitor during a live user session.

In some cases, user activity may be monitored when the user is actively participating or interacting with the application. That is, user activity may be monitored when a user or user session is active. A user or user session can be considered active when the user activity is ongoing. Any number of methods can be used to determine whether a user or user session is active. As one example, a user may be considered active when at least one user activity or interaction is recognized within a predetermined time period (e.g., 2 minutes). In this regard, a user that is no longer active can be considered void and, as such, removed from the active set. For example, a website visitor that has two minutes of inactivity can be considered no longer active. In such a case, the user activity monitor 120 may discontinue monitoring of activity for that user.

The event detector 124 is configured to detect events. An event refers to any occurrence or outcome that can be recognized or inferred (generally referred to herein as detected). As described herein, an event may be an action event or an inaction event. An action event refers to an event that is recognized or inferred in association with an action(s) or activity(s) performed by a user. By way of example, an action event may include a selection of a link, a selection to purchase an item, navigation to a webpage, navigation to a particular webpage followed by selection of a link, etc. An inaction event refers to an event that is recognized or inferred in association with an action(s) or activity(s) not performed by a user. In this regard, an inaction event can be inferred when a user has not performed a particular action or set of actions. By way of example, and without limitation, an inaction event may include a lapse of a predetermined time period without performing a particular activity (e.g., selection of a link, navigation to a webpage, etc.), not performing a particular activity after performing another particular activity, not completing a purchase of an item within a particular time following the item being added to a shopping cart, or the like. As can be appreciated, storing user activities, for example, in data store 122, upon being detected by the user activity monitor 120 may enable inaction events to be detected based on actions or activities not performed by the user.

Events can be detected by way of event rules. Rules to define an event, or event rules, can be any rule or indication defining or describing an event or triggering recognition or inference thereof. In some cases, an event rule can be provided by an administrator via an administrator device, such as administrator device 102 or 104. In this regard, an administrator can define events of interest with regard to its website or application. For example, an administrator may specify an action(s) or inaction(s) that, if performed and/or not performed, indicate or describe an event. To this end, an administrator may define a page view, ad view, cart add, item purchase, link selection, series of activities, etc. as an event (action event) in instances that such activity(s) or action(s) occurs. By comparison, an administrator may define a first page view followed by a lack of a second page view, a first page view followed by a lack of shopping cart addition within a particular period of time, etc., as an event (inaction event) in instances that an activity or action does not occur.

As another example, an event can be defined based on an intent or propensity inferred or predicted for a user. In this regard, when a user is inferred to have a particular intent or propensity, an event (action event or inaction event) can be predicted. A user's intent or propensity can be determined based on an activity not occurring within a predetermined time period, a probability of an activity not occurring, or the like. In some cases, an intent score can be calculated to indicate a user's intent to perform or not perform an action. In such a case, when an intent score exceeds a threshold, an event (action or inaction event) can be predicted or deemed to have occurred. For instance, predictive logic could be used to calculate a user's propensity or intent score. By way of example only, and without limitation, assume that a user has a first item in a shopping cart and has not selected to purchase the item within twenty minutes. Further assume that an intent score is calculated to be 50% indicating that the user may or may not abandon the shopping cart. If a threshold is defined as 70% to designate an event, an event may not be designated as having occurred. On the other hand, assume that a user has twenty items in a shopping cart and has not yet selected to purchase the items within twenty minutes. In this case, further assume that an intent score is calculated to be 75% with a predefined threshold defined as 70% to designate an event. In such a case, an abandonment event may be deemed or designated as having occurred based on the high likelihood of abandonment inferred from the user's inaction to purchase the items within twenty minutes.

As can be appreciated, a user's calculated intent can change over time. For instance, after five minutes with one item in a shopping cart, a user's intent score may be calculated to be 30%, after twenty minutes with the same item in the shopping cart, the user's intent score may be calculated to be 50%, and after one hour with the same item in the shopping cart, the user's intent score may be calculated to be 85% percent. Any calculation or algorithm can be used to calculate or determine an intent score. Such a calculation or algorithm may be linear or non-linear. Further, an intent score can be represented using any scale, numbers, symbols, or other values.

A user intent can be inferred using any type of variables or data, such as particular action(s) or inaction(s) performed, type of user device, historical data of the user (that may indicate intent), historical data of a set of users, various time periods, particular items, products, number of products, or the like. These are only examples of data that can be used to infer user intent and embodiments described herein are not intended to be limited in scope to such examples. Such variables or intent may be specified by an administrator or automatically determined. By way of example, historical data associated with a number of users may be analyzed to automatically determine that a user intent is greater than 75% likely to abandon a shopping cart with one item in the cart when the user does not select to purchase the item within one hour of adding the item to the shipping cart.

In some cases, the event detector 124 may be configured to monitor for events in accordance with a time duration, such as a lapse of a predetermined time period. For instance, the event detector 124 may scan for events, such as active events and/or inactive events of active users, every two seconds.

Upon detecting or predicting an event or set of events, the event notifier 126 is configured to provide a notification of such an event(s). An event notification may include any information associated with the event and/or the user, for example. For instance, an event notification may include details regarding a current user and activities performed thereby, such as page path, event(s) triggered during the visit, product(s) in the cart, etc.

The event notifier 126 may provide an event notification to any component. For instance, an event notification might be provided to an administrator via an administrator device. As another example, an event notification may be provided to another component (e.g., within an analytics tool or remote service) that can provide the data into a report format for presentation to an administrator or other party of interest.

Figure 2:
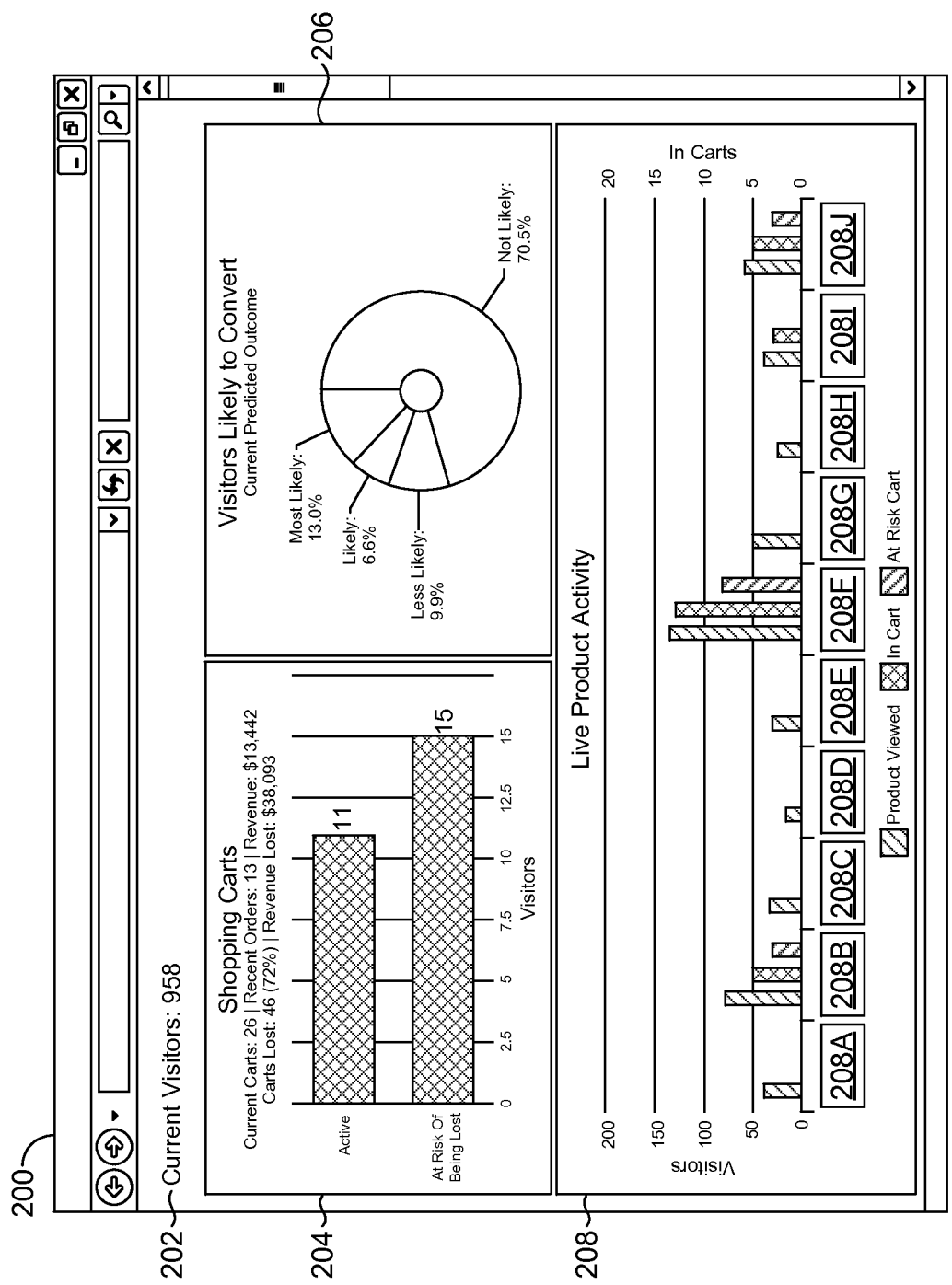
FIG. 2 is a user display interface illustrating a graphical representation of various analytics data displayed graphically according to an example embodiment.

For example, as illustrated in FIG. 2, a graphical user interface 200 can be configured to display event data, including predictive data. Such a graphical user interface 200 may be presented to an administrator or other interested party via a web browser or application at an administrator or like device. As illustrated in FIG. 2, the exemplary user interface 200 includes live observational data and live predictive analysis data. For example, a visitor counter 202 and a shopping cart portion 204 display real-time observational data on live or current user sessions. A likelihood of conversion portion 206 is included for showing an interested party current predicted outcomes of the live user sessions. The likelihood of conversion portion 206 includes data calculated using predictive analysis, for instance, as described in association with the event detector 124. The live product activity portion 208 includes a combination of live observational data and live predictive analysis data for unique products available for sale. In the illustrated user interface, the live product activity portion 208 includes, for live user sessions, the number of views for each product 208A-208J, the number of products that have been added to shopping carts, and the number of carts at risk for abandonment.

Returning to FIG. 1, in addition or in the alternative to providing an event notification, the event notifier 126 of FIG. 1, or another component or device, may be configured to initiate or apply a target experience. A target experience refers to any activity, event, or experience intended to provide a personalized or targeted experience for a user. In this regard, a target experience can be initiated or applied in accordance with an occurrence of a particular detected event or set of events. That is, the event notifier 126 or other component may, based on a detected event(s), automatically recognize an undesirable behavior and make an effort to provide assistance or modify the user's intent. By way of example only, and without limitation, a target experience may be an advertisement (e.g. a particular ad) to present to a user, a discount to purchase an item(s), a chat session request or prompt, modified content, or the like. A particular target experience to apply for a detected event or set of events may be provided by an administrator, for instance, via an administrator device.

As can be appreciated, in embodiments, the event notifier 126 may simply provide a notification(s) of an event(s), but another component may be configured to initiate or apply a target experience. For instance, the event notifier 126 may provide a notification of an event to an administrator device, or other device associated with an application being monitored (e.g., web server), which may be configured to use such data to trigger a target experience for the user. As such, an administrator device may utilize details pertaining to the user or user actions to determine a target experience, or data associated therewith, to initiate or apply. For instance, the specific user actions may be analyzed to automatically select a type of target experience to apply or to select details related to a target experience, such as a particular advertisement to display or content to modify. The administrator device may then either apply the target experience, that is, implement the target experience such that it is realized by the user or may trigger another computing device to implement the target experience.

Irrespective of the component that initiates, triggers, or applies a target experience, such a target experience can be provided to an appropriate user device, such as user device 112, 114, or 116. To this end, the user device may present the target experience to the corresponding user via a display screen, audio component, or the like, of the user device. As such, a user of the user device 112, 114, or 116 may view an advertisement, a discount, an assistance request, or a modification of content based on the user's actions or inactions that were recognized or predicted as events. In this manner, the target experience can be applied in connection with the user while the user continues interacting with the application being monitored (e.g. during an interactive session). As such, corrective actions to modify an undesirable behavior associated with a user may be taken or influential actions to influence the user may be taken.

Figure 3:
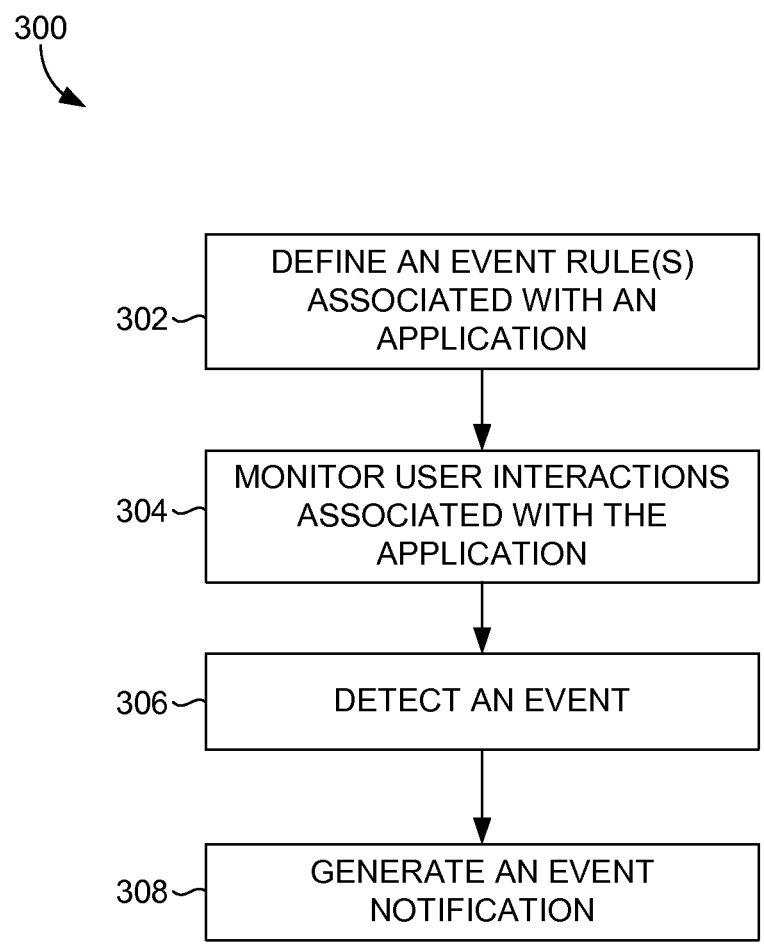
FIG. 3 is a flow chart illustrating an exemplary embodiment for detecting and communicating events based on live user interaction data, in accordance with embodiments of the present invention.

Turning now to FIG. 3, a flow diagram 300 shows a method for detecting and communicating events based on live user interaction data, in accordance with embodiments of the present invention. Such a method may be employed, for example, by an analytics tool, such as analytics tool 106 of FIG. 1.

Initially, as shown at block 302, event rules associated with an application are defined. An event rule may be defined based on input received, for instance, from an administrator indicating events associated with the application for which the administrator wishes to be notified. Such event rules may be defined based on actions or inactions taken or not taken by a user. At block 304, user activity associated with an application is monitored. In embodiments, user interactions with the application can be detected and an indication of the user interaction can be captured for use in detecting events. For instance, while interactions with the application are being monitored, data related to the interactions may be transmitted to and stored in a data store, such as data store 122 of FIG. 1.

At block 306, an event is detected in accordance with a user inaction. That is, an event is determined to have occurred based on at least one interaction with the application that was not performed by a user. As described above, detection of an event can take into account any variety of externally sourced data, including historical data related to monitored user activity and/or external event data (e.g., user locale, news events, live weather and/or traffic information, etc.). The detection of the event may be based on a high likelihood of an activity of interest being performed or not being performed by the user. For example, an activity being performed by the user may be the act of checking-out and paying for items in the user's shopping cart. Conversely, an activity not being performed by the user may be the lack of action in paying for items in the user's shopping cart. In more detail, a user's likelihood of checking-out items in his or her shopping cart may be indicated by particular actions taken or not taken by the user (i.e., entering credit card information, reviewing cart contents, adding more items, etc.). Upon detecting an event, an event notification is generated and provided, for example, to an administrator device. Generation of an event notification is illustrated at block 308.

Figure 4:
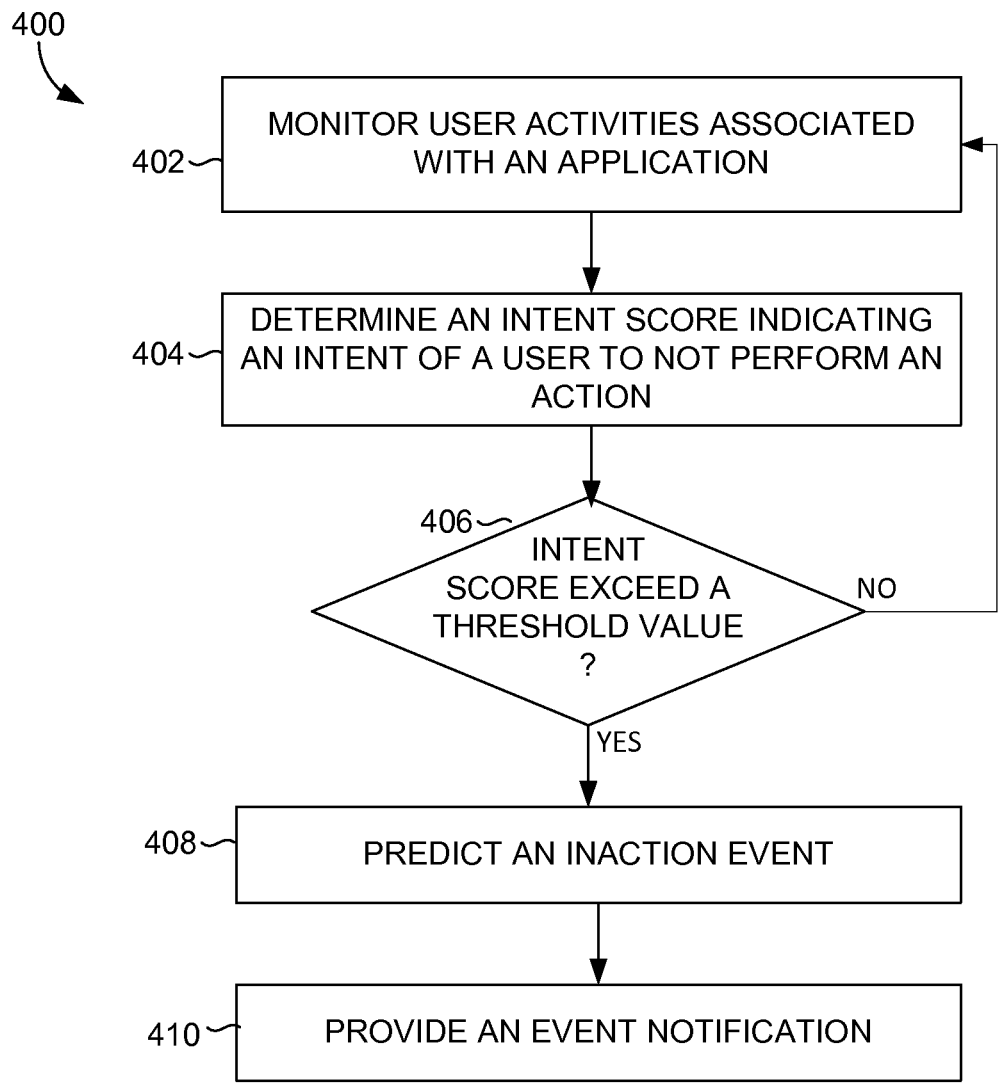
FIG. 4 is a flow diagram showing a method for predicting an event in accordance with a lack of action, in accordance with embodiments of the present invention.

With reference to FIG. 4, FIG. 4 provides a flow diagram illustrating a method 400 for predicting an event in accordance with a lack of action. Such a method may be employed, for example, by an analytics tool, such as analytics tool 106 of FIG. 1.

Initially, at block 402, user activities associated with an application are monitored. As can be appreciated, indications of such user activities may be stored in a data store for reference to determine whether inaction events have occurred. At block 404, an intent score indicating an intent of a user to not perform an action(s) is determined. In some embodiments, an intent score is a dynamic variable that can be used to measure a likelihood of an intent indicating either abandonment or lack of conversion. It can be appreciated that the intent score can be tied to any inaction of interest in association with the application. In some cases, the intent score may be increased as time prolongs without detection of a particular action taken by the user (e.g., enter credit card information, complete transaction, select a link, etc.). For instance, an intent score might be increased by contiguous integers or increased by a calculated value that incorporates numerous analyzed variables. Although the intent score is described in association with an inaction with reference to FIG. 4, the intent score may alternatively or additionally be associated with an action(s).

At block 406, it is determined whether the intent score exceeds a threshold value. In this regard, the intent score can be compared to a predetermined threshold value to determine whether the threshold value is exceeded. Such a threshold value can be selected (e.g., automatically or by an administrator) to indicate a likelihood or inference that an inaction will occur in association with a user visit (e.g., user session) to an application. If the intent score does not exceed a threshold value, the method returns to block 402 at which user activities are monitored. If, however, the intent score does exceed a threshold value, an inaction event is predicted or inferred. That is, a user is deemed to have not performed a particular action or set of actions. This is indicated at block 408. Based on the designation of an inaction event, a notification of the event is provided, as indicated at block 410. An event notification may be provided to, for instance, an administrator or other party interested in collecting data associated with an application.

Figure 5:
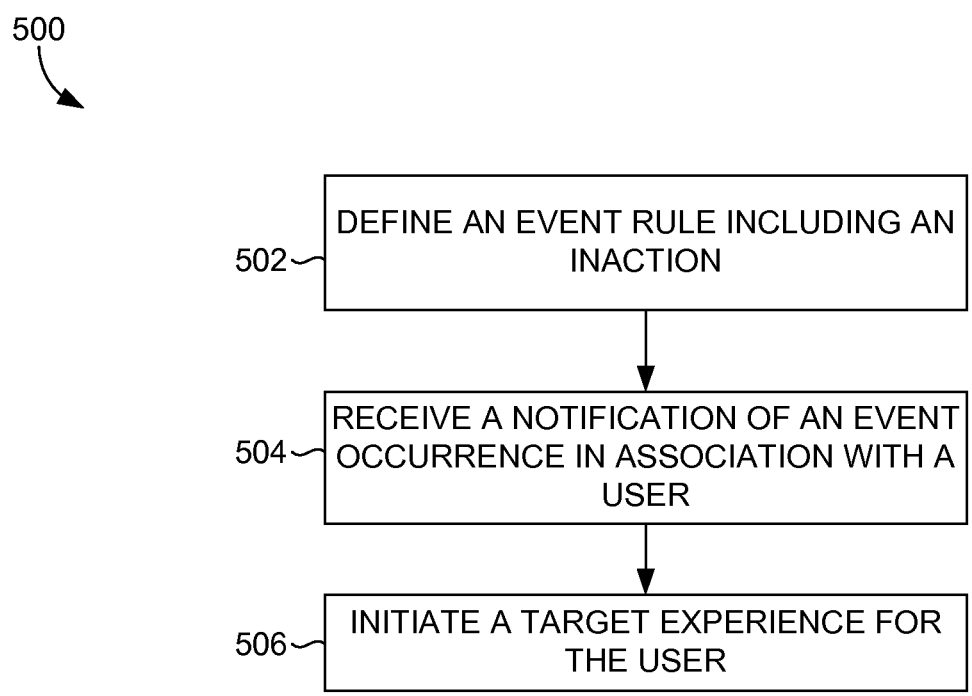
FIG. 5 is a flow diagram showing a method for obtaining event notifications according to embodiments of the present invention.

Turning now to FIG. 5, FIG. 5 provides a flow diagram illustrating a method 500 for obtaining event notifications. Such a method may be employed, for example, by an administrator device, such as administrator device 102 of FIG. 1. Initially, at block 502, an event rule including an inaction is defined. An event rule may be defined based on input provided by an administrator. An event rule including an inaction refers to a rule used to detect an event based on an action or activity associated with an application not being performed by a user. After an event rule has been established, at block 504, a notification of an event occurrence in association with a user is received. The event notification is based at least on a user inaction defined in the event rule. In this way, for example, an administrator device can be notified when an action is deemed to have not been performed by a user. At block 506, a target experience for the user is initiated. As such, based on an action not occurring by the user, a targeted experience can be automatically initiated (without user intervention) in an effort to encourage or redirect a user's inferred intent. Such an initiated target experience may include presentation of an advertisement, presentation of an assistance dialogue box, modification of content provided or to be provided to the user, or the like.

Figure 6:
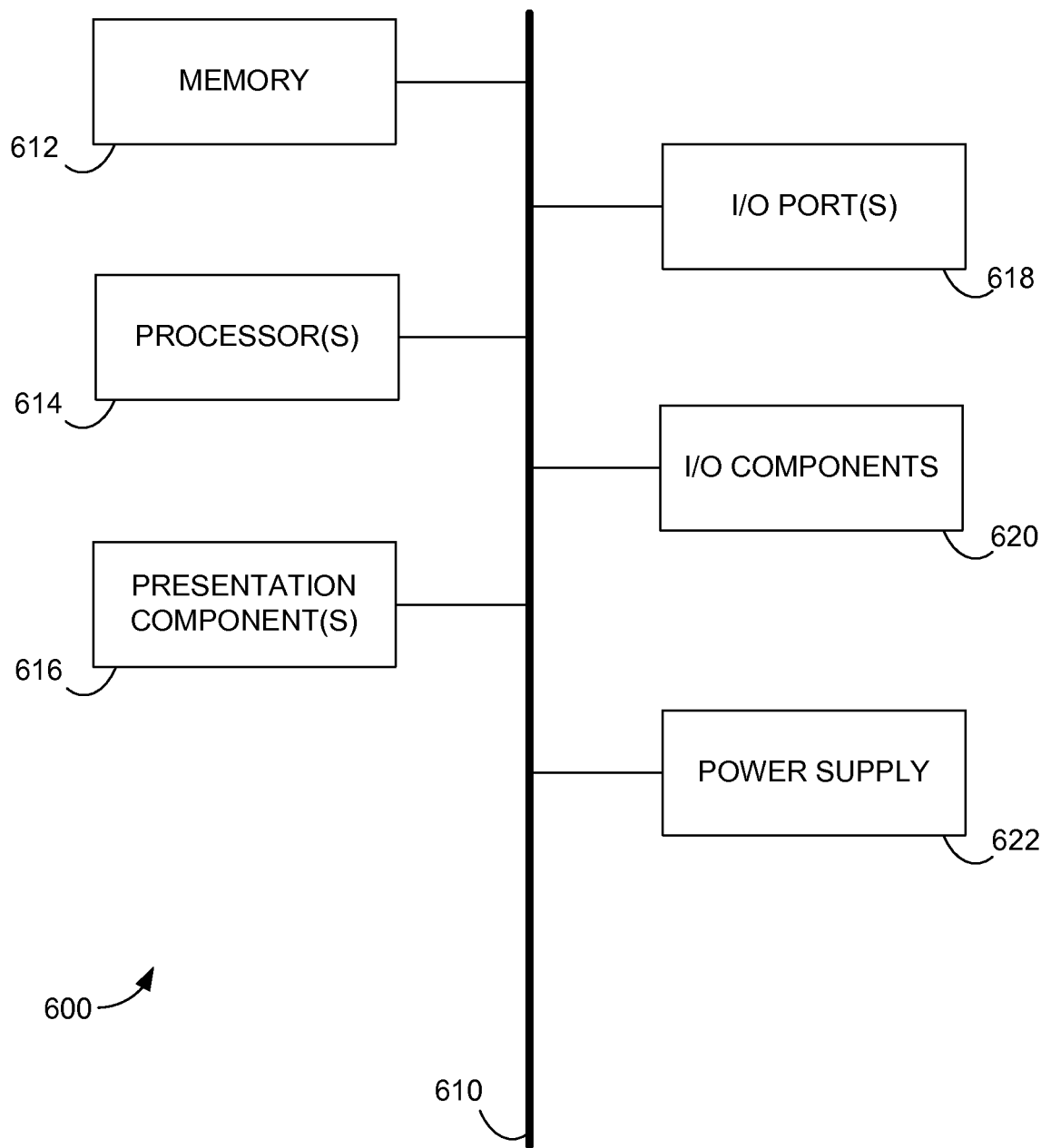
FIG. 6 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, providing an analytics tool for detecting real-time user or "web visitor" events based on real-time data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
   determining, by a server device, that an application session with a first remote client device is currently active in response to determining that a first input activity, initiated by the remote client device, corresponds to a first action associated with an action event;
   determining, by the server device, subsequent actions that, when initiated after the first action, are indicative of a continuation of the action event;
   determining, by the server device via the determined currently active application session, that a second input activity, initiated by the first remote client device, corresponds to a second action not included in the subsequent actions;
   responsive to the second action, calculating an intent score based on a comparison of the second action to one or more of the subsequent actions, the calculated intent score representative of a likelihood that the determined currently active application session will result in the continuation of the action event;

determining that the calculated intent score exceeds an intent score threshold;

responsive to the calculated intent score exceeding the intent score threshold, communicating, by the server device to a second remote client device, a first notification;

receiving, by the server device from the second remote client device, a selection that corresponds to one of a plurality of targeted responses presented thereto based on the communicated first notification; and communicating, by the server device to the first remote client device via the determined currently active application session, a second notification generated in response to the received selection.

2. The method of claim 1, wherein the comparison of the second action to one or more of the subsequent actions comprises determining a calculated likelihood that a third input activity will be detected that corresponds to one of the subsequent actions based at least in part on the second input activity.

3. The method of claim 1, wherein the intent score is calculated based at least in part on a determined duration between the first input activity and the second input activity.

4. The method of claim 1, wherein the determining that the second input activity corresponds to a second action not included in the subsequent actions includes comparing the second input activity to externally sourced data.

5. The method of claim 1, wherein the second notification corresponds to the selected targeted response.

6. The computer-implemented method of claim 1, wherein the second generated notification corresponds to the selected one of the plurality of presented targeted responses.

7. One or more computer storage media storing computer-useable instructions that, when used by one or more computing devices, cause the one or more computing devices to perform operations comprising:

determining that an application session with a remote client device is currently active in response to determining that a first input activity, initiated by the remote client device, corresponds to a first action associated with an action event;

determining subsequent actions that, when initiated after the first action, indicate a continuation of the action event;

determining that a second input activity, initiated by the remote client device via the determined currently active application session, corresponds to a second action not included in the subsequent actions;

responsive to the second action, calculating an intent score based on a comparison of the second action to one or more of the subsequent actions, the calculated intent score representative of a likelihood that the determined currently active application session will result in the continuation of the action event;

determining that the calculated intent score is greater than an intent score threshold indicating that the determined currently active application session is unlikely to result in the continuation of the action event; and responsive to the intent score being greater than the intent score threshold, transmitting a notification to the remote client device and via the determined currently active application session.

8. The one or more computer storage media of claim 7, wherein an input activity corresponds to at least one of a page view, an ad view, a cart addition, an item purchase, or a link selection.

9. The one or more computer storage media of claim 7, wherein at least one of the subsequent actions includes a maximum measured duration from the first action.

10. The one or more computer storage media of claim 7, wherein the determining that the second input activity corresponds to the second action not included in the subsequent actions is based at least in part on external event data obtained from an external data source.

11. The one or more computer storage media of claim 7, further comprising computer-useable instructions that, when used by one or more computing devices, cause the one or more computing devices to perform operations comprising:

generating, prior to the generation of the notification transmitted to the remote client device, another notification for communication to another remote client device based at least in part on the comparison between the second action and the one or more subsequent actions;

receiving, prior to the generation of the notification provided to the remote client device, a targeted response selected via the other remote client device, wherein the notification is generated based further in part on the selected targeted response.

12. A computerized system comprising:

one or more processors; and one or more computer storage media storing computer-useable instructions that, when used by the one or more processors, cause the one or more processors to:

determine that an application session with a remote client device is currently active in response to a determining that a first input activity, initiated by the remote client device, corresponds to a first action associated with an action event;

determine subsequent actions that, when initiated after the first action, indicate a continuation of the action event;

determine, via the determined currently active application session, that a second input activity corresponds to a second action not included in the subsequent actions;

responsive to the second action, calculate an intent score based on a comparison of the second action to one or more of the subsequent actions, the calculated intent score representative of a likelihood that the determined currently active application session will result in the continuation of the action event;

determine that the calculated intent score is greater than an intent score threshold indicating that the determined currently active application session is unlikely to result in the continuation of the action event; and responsive to the intent score being greater than the intent score threshold, transmit a notification to the remote client device and via the determined currently active application session.

13. The computerized system of claim 12, wherein the generated notification corresponds to a target experience selected based at least in part on the second input activity corresponding to the second action.

14. The computerized system of claim 13, wherein the target experience corresponds to the second action.

15. The computerized system of claim 12, wherein the one or more computer storage media further store computer-useable instructions that, when used by the one or more processors, cause the one or more processors to:

communicate, to another remote client device, another notification generated based on the second input activity corresponding to the second action not included in the subsequent actions, the communicated other generated notification causing the other remote client device to present at least one target experience, and
wherein the generated notification is communicated to the remote client device based further in part on a receipt of a selected target experience from the other remote client device.

* * * * *